March 20, 1973  D. D. KERR  3,721,467

MOLDED PLASTIC COVER TO ENCLOSE A SNOWMOBILE ON A TRAILER

Filed Feb. 3, 1971

INVENTOR.
DONALD D. KERR

BY
Andrus, Sceales, Starke & Sawall

ATTORNEYS

United States Patent Office 3,721,467
Patented Mar. 20, 1973

3,721,467
MOLDED PLASTIC COVER TO ENCLOSE A SNOWMOBILE ON A TRAILER
Donald D. Kerr, Box 338, Hartland, Wis.
Filed Feb. 3, 1971, Ser. No. 112,255
Int. Cl. B60p 7/02
U.S. Cl. 296—28 M          9 Claims

ABSTRACT OF THE DISCLOSURE

A molded reinforced plastic cover to enclose a snowmobile on a trailer. The cover is preferably formed of two longitudinally-split halves which are joined together by spring loaded clamps. The lower edge of the cover carries a resilient sealing member which rests on the bed of the trailer, and straps extend downwardly from the cover through openings in the bed and locking members can be attached to the straps. The lower edge of the forward end of the cover is provided with slots to receive the projecting ends of the skis of the snowmobile. The cover serves to protect the snowmobile from the elements, as well as preventing theft of the snowmobile.

BACKGROUND OF THE INVENTION

This invention relates to a molded reinforced plastic cover to enclose a snowmobile on a trailer.

A snowmobile is normally transported on a small flat-bed trailer, and a protect the snowmobile from the elements, such as rain and snow, as well as road salt spray, canvas or fabric covers are frequently used. Even though the canvas cover may be fitted to the snowmobile, the canvas has a tendency to flap or whip at high speed travel which will eventually cause ripping of the canvas. Moreover, canvas covers are no deterent to the theft of a snowmobile which is a major problem, due to the fact that snowmobiles do not bear serial numbers and normally are not registered.

SUMMARY OF THE INVENTION

The present invention is directed to a rigid molded plastic snowmobile cover which overcomes the problems associated with flexible fabric covers. The cover can be fabricated as a one-piece unit, or preferably in two longitudinally split halves or sections, and the front portion of the cover is inclined upwardly to decrease wind resistance and accommodate the windshield of the snowmobile. The lower edge of the forward end of the cover is provided with a pair of slots or recesses to receive the projecting forward ends of the snowmobile skis.

To secure the cover to the trailer, a series of straps or locking elements are embedded within the cover and extend downwardly through holes in the trailer bed. A padlock or other locking member can be attached to the projecting ends of the straps to thereby prevent removal of the cover from the trailer bed and thus prevent theft of the snowmobile. In addition to the locking straps, a hasp can also be used to secure the cover to the upper surface of the trailer bed.

With the two-piece unit the adjacent edges of the halves are provided with sealing members or gaskets and the halves are connected together by a series of spring loaded catches which serve to compress the gaskets and provide a weather-tight joint.

The snowmobile cover is a rigid molded unit which can be locked to the trailer to thereby prevent theft of the snowmobile from the trailer. The cover has an attractive appearance and will protect the snowmobile against the elements, such as rain, snow or sleet, as well as protecting the snowmobile from road spray during transporting. In addition to protecting the snowmobile during transporting, the cover also serves to protect the snowmobile during storage.

As the cover is rigid, it will not whip or flap at high speed travel and thus eliminates the problem normally associated with flexible covers, such as canvas.

Other objects and advantages will appear in the course of the following description.

The drawings illustrate the best mode presently contemplated of carrying out the invention.

Figure 1:
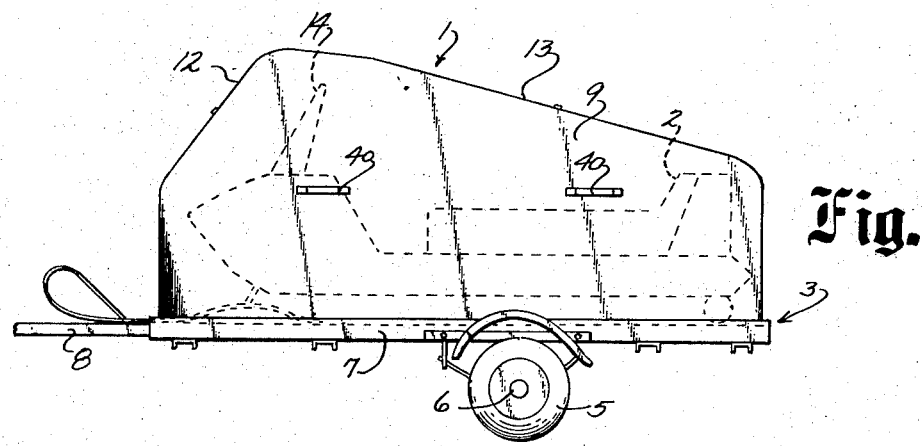
FIG. 1 is a side elevation of the snowmobile cover as mounted on a trailer.
Figure 2:
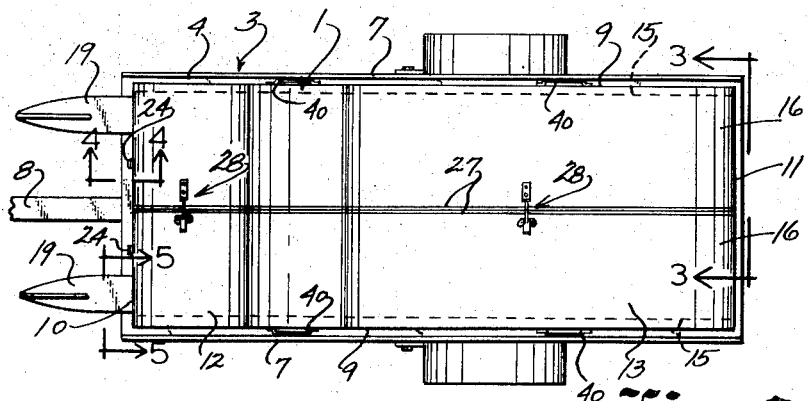
FIG. 2 is a top view of the cover.
Figure 5:
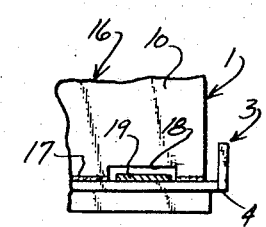
FIG. 5 is a plan view of one of the catches for locking the cover halves together.
Figure 3:
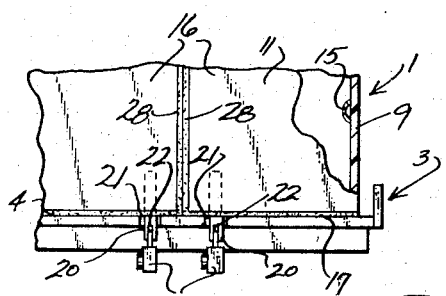
FIG. 3 is an end view of the cover taken along line 3—3 of FIG. 2.
Figure 4:
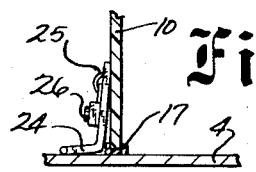
FIG. 4 is an enlarged fragmentary section taken along line 4—4 of FIG. 2.
Figure 6:
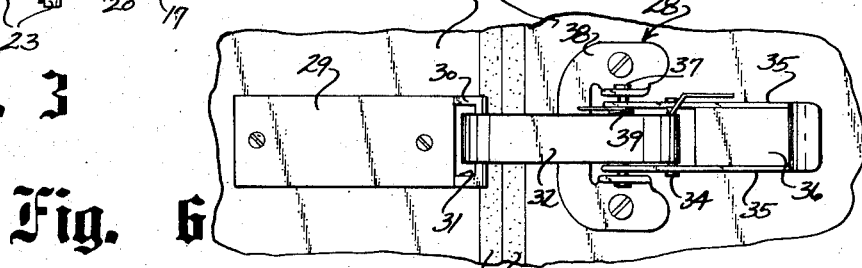
FIG. 6 is a side elevation of the catch shown in FIG. 5.
Figure 7:
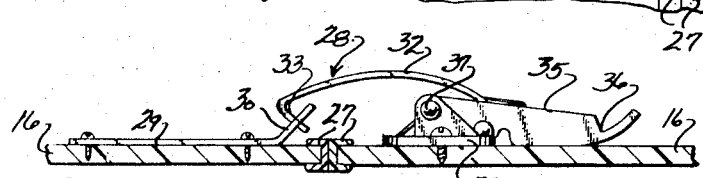
FIG. 7 is a section taken along line 5—5 of FIG. 2.

The drawings illustrate a rigid, molded, reinforced plastic snowmobile cover 1, which is adapted to protect a snowmobile 2 carried on a tralier 3. As illustrated in FIG. 1, the trailer includes a flat-bed 4 which is mounted for transporting on wheels 5 carried by axle 6. A pair of side rails 7 extend along the side edges of the bed 4, and a tongue 8 is connected to the forward end of the bed and is adapted to be attached to a vehicle, such as a car or truck, for transporting.

The cover 1 is a rigid member preferably formed of a thermosetting resin, such as an epoxy or polyester resin, reinforced with fibrous material, such as glass fibers. The cover includes a pair of generally vertical side walls 9, a front wall 10 and a rear wall 11. Connecting the side walls 9, front wall 10 and rear wall 11 are a pair of top wall sections 12 and 13. The top wall section 12 is sloped upwardly and to the rear to accommodate the windshield 14 of the snowmobile 2, while the rear section 13 slopes downwardly to the rear.

To stiffen the cover, the interior surface of the side wall can be provided with a series of reinforcing ribs 15.

The cover 1 can either be formed as a one-piece unit, or preferably, in longitudinally-split halves or sections 16. The two-piece unit, as illustrated in the drawings, has the advantage in that the individual halves 16 can be readily handled by one man, while the one-piece unit will generally require two men to install and remove the cover from the trailer.

The lower edge of the cover 1 carries a resilient sealing member 17 which is adapted to engage the bed 4 and prevent entry of dust, moisture, salt spray, or the like into the interior of the cover.

The lower edge of the front wall 10 is provided with a pair of notches or slots 18 which receive the skis 19 of the snowmobile. The skis 19 normally extend beyond the forward edge of the bed 4. While the drawings show slots 18 formed in the plastic cover 1 to receive the skis, it is contemplated that other structures can be employed to accommodate the ends of the skis. For example, if the sealing member 17 has a substantial depth and is formed of a soft compressible material, it can deform to the contour of the skis so that no distinct recess or notch would have to be formed in the rigid molded cover.

To lock the cover 1 to the trailer 3, a series of locking straps 20 are embedded within the cover 1 and project downwardly through holes 21 in the bed 4. The lower projecting ends of the locking straps 20 are provided with holes 22 which can receive a padlock 23 or other locking device.

In addition to the locking straps 20, a hasp 24 can be connected to the upper surface of the forward end of the bed 4, and the opening in the hasp is adapted to receive a loop 25 secured to the front wall 10 of the cover. A padlock 26 or other locking device can be inserted through the loop 25 to secure the forward portion of the cover to the trailer bed.

As previously noted, the cover 1 is preferably formed of two longitudinally-split halves 16 and sealing strips 27 are mounted along the abutting edges of the two halves and serve to seal the joint between the halves. To connect the halves 16 together, a series of spring loaded catches 28 are utilized. Each catch includes a strap 29 secured to one of the halves 16 and provided with an outwardly curved end 30 having an opening 31. Mounted on the other of the halves 16 is a curved locking member 32 having a hooked end 33 which is adapted to engage the opening 31 in strap 29. Locking member 32 is pivotally connected by pin 34 between a pair of side members 35 of an arm 36 which is pivotally attached by pin 37 to the mounting bracket 38 secured to the cover half 16. Spring 39 is wound around the pin 37 and one end of the spring bears against the bracket 38, while the opposite end is connected to the arm 36. With this construction, arm 36 can be pivoted upwardly against the force of spring 39 so that the hooked end 33 can be engaged with the opening 31 in strap 29. By pivoting the arm 36 downwardly against the cover half 16, the abutting edges of the two halves 16 will be drawn tightly together to compress the sealing strips 27. Spring 39 acts to bias the arm 36 to the locked position.

To facilitate the installing and removal of the cover halves 16, a pair of handles 40 can be mounted on each half 16.

The cover of the invention provides complete protection for the snowmobile against rain, snow, wind and sun, both during transporting and storage. In addition, the cover has a prime advantage in protecting the snowmobile against road salt and mud spray during transporting. As the cover is formed of a rigid plastic material it will not whip when the trailer is transported at high speeds as would a conventional flexible fabric, such as canvas.

As the cover can be securely locked to the trailer by means of the locking elements 20 and the hasp 24, theft of the snowmobile from the trailer is prevented.

Various modes of carrying out the invention are contemplated as being within the scope of the following claims particularly pointing out and distinctly claiming the subject matter which is regarded as the invention:

I claim:

1. An enclosure for a snowmobile, comprising a trailer having a generally flat bed to carry a snowmobile, and a rigid cover mounted on the bed and adapted to enclose the snowmobile, said cover having an open bottom bordered by a low peripheral edge, and having an end wall disposed generally transverse to the direction of travel of the trailer, means defining an opening and located in the lower edge of said end wall for receiving the projecting ends of the skis of the snowmobile, and locking means for securing the cover to the bed.

2. The enclosure of claim 1, and including sealing means carried by said lower edge and disposed to engage the bed and seal the joint therebetween.

3. The enclosure of claim 1, and including a pair of side rails mounted on the sides of the trailer bed and projecting upwardly therefrom, said cover including a pair of generally vertical side walls disposed adjacent said side rails.

4. The enclosure of claim 1, wherein said locking means includes at least one locking element secured to the cover and extending downwardly therefrom, said bed being provided with an opening to receive said locking element, said locking means also including a locking member removably connected to the projecting end of the locking element and located beneath said bed.

5. The enclosure of claim 4, wherein said locking member is a padlock.

6. The enclosure of claim 1, wherein the means for receiving the skis comprises a pair of spaced recesses formed in said lower edge.

7. The enclosure of claim 1, wherein said cover includes a pair of generally vertical side walls and a central wall connecting the side walls together, said central wall including an upwardly and rearwardly inclined section disposed to accommodate the windshield of a snowmobile.

8. An enclosure for a snowmobile, comprising a trailer having a generally flat bed to carry a snowmobile, and a rigid cover mounted on the bed and adapted to enclose the snowmobile, said cover having an open bottom bordered by a lower peripheral edge, and having an end wall disposed generally transverse to the direction of travel of the trailer, sealing means carried by said lower edge and disposed to engage the bed and seal the joint therebetween, said cover being formed of two longitudinally split sections, means defining an opening at the lower edge of the end wall for receiving the projecting ends of the skis of the snowmobile, locking means for securing the cover to the bed, a sealing element connected to at least one of the adjacent edges of the sections, said connecting means including a spring loaded catch disposed to compressed said sealing element when in the locked position to seal the joint between the sections.

9. The enclosure of claim 8, and including handle means secured to each of said sections and serving to facilitate installation and removal of the cover from the bed.

References Cited
UNITED STATES PATENTS

| | | | |
|---|---|---|---|
| 3,180,510 | 4/1965 | Moller | 214—506 |
| 1,258,576 | 3/1918 | Kahn | 105—377 |
| 2,949,867 | 8/1969 | Ramsey | 296—100 X |
| 2,310,431 | 2/1943 | Hart | 296—36 X |
| 3,149,738 | 9/1964 | Bombardier | 180—5 R |

BENJAMIN HERSH, Primary Examiner

J. A. PEKAR, Assistant Examiner

U.S. Cl. X.R.

180—5 R; 296—35 A, 100